United States Patent
Swearingen et al.

(10) Patent No.: US 11,331,839 B1
(45) Date of Patent: May 17, 2022

(54) SHAPED OR SIZED ENCAPSULATED REACTANT AND METHOD OF MAKING

(71) Applicant: SPECIALTY EARTH SCIENCES, LLC, New Albany, IN (US)

(72) Inventors: Lindsay Swearingen, Floyds Knob, IN (US); Jason Swearingen, Floyds Knob, IN (US)

(73) Assignee: SPECIALTY EARTH SCIENCES, LLC, New Albany, IN (US)

( * ) Notice: Subject to any disclaimer, the term of this patent is extended or adjusted under 35 U.S.C. 154(b) by 1 day.

(21) Appl. No.: 16/861,420

(22) Filed: Apr. 29, 2020

Related U.S. Application Data

(63) Continuation of application No. 15/342,845, filed on Nov. 3, 2016, now Pat. No. 10,647,045.

(51) Int. Cl.
| | |
|---|---|
| *B29C 48/03* | (2019.01) |
| *B29B 7/88* | (2006.01) |
| *B29C 48/00* | (2019.01) |
| *B29B 13/02* | (2006.01) |
| *B29B 9/12* | (2006.01) |
| *B29B 13/04* | (2006.01) |
| *C02F 103/06* | (2006.01) |
| *C02F 1/68* | (2006.01) |
| *B09C 1/08* | (2006.01) |
| *B09C 1/00* | (2006.01) |
| *B29K 91/00* | (2006.01) |

(52) U.S. Cl.
CPC .............. *B29C 48/022* (2019.02); *B29B 7/88* (2013.01); *B29B 9/12* (2013.01); *B29B 13/022* (2013.01); *B29B 13/04* (2013.01); *B29C 48/0022* (2019.02); *B09C 1/002* (2013.01); *B09C 1/08* (2013.01); *B09C 2101/00* (2013.01); *B29K 2091/00* (2013.01); *C02F 1/68* (2013.01); *C02F 2103/06* (2013.01)

(58) Field of Classification Search
CPC ... B29C 48/022; B29C 48/0022; B29C 48/04; B29B 7/88; B29B 13/04; B29B 9/12; B29B 13/022; B29B 9/06; C02F 1/68; C02F 2103/06; C02F 1/687; B29K 2091/00; B09C 1/08; B09C 1/002; B09C 2101/00; B09C 1/00; B01J 2/20; B01J 2/006
See application file for complete search history.

(56) References Cited

U.S. PATENT DOCUMENTS

| | | | |
|---|---|---|---|
| 4,013,784 A * | 3/1977 | Speiser | A61K 9/2013 424/502 |
| 4,614,599 A * | 9/1986 | Walker | C09K 8/03 175/72 |
| 7,546,668 B2 | 6/2009 | Strelnieks | |
| 9,289,840 B1 | 3/2016 | Jacobs | |
| 9,649,802 B2 | 5/2017 | Thepsimuang et al. | |
| 10,183,316 B2 | 1/2019 | Dugan et al. | |
| 2003/0069263 A1* | 4/2003 | Breder | A61P 25/30 514/282 |
| 2017/0058153 A1 | 3/2017 | Schroeyers et al. | |

FOREIGN PATENT DOCUMENTS

WO  WO-2017109055 A1 *  6/2017 .............. C08K 3/22

* cited by examiner

*Primary Examiner* — Irina S Zemel
(74) *Attorney, Agent, or Firm* — Witters & Associates; Steve Witters

(57) ABSTRACT

Technologies are described for a method of making an encapsulated reactant having a desired shape or size. The method comprises providing solid reactant particles and an encapsulating material. The encapsulating material is heated above its solidification temperature to form a molten, semi-solid, or liquid encapsulating material. The solid reactant particles are added to the molten, semi-solid, or liquid encapsulating material and mixed to disperse the solid reactant particles in the encapsulating material and form a mixture. The mixture may be extruded or formed into the desired shape or size of the encapsulated reactant, or the mixture may be solidified and extruded, granulated, shredded, ground, or pressed into the desired shape or size.

14 Claims, 2 Drawing Sheets

SHAPED OR SIZED ENCAPSULATED REACTANT AND METHOD OF MAKING

RELATED APPLICATION DATA

Figure 1:
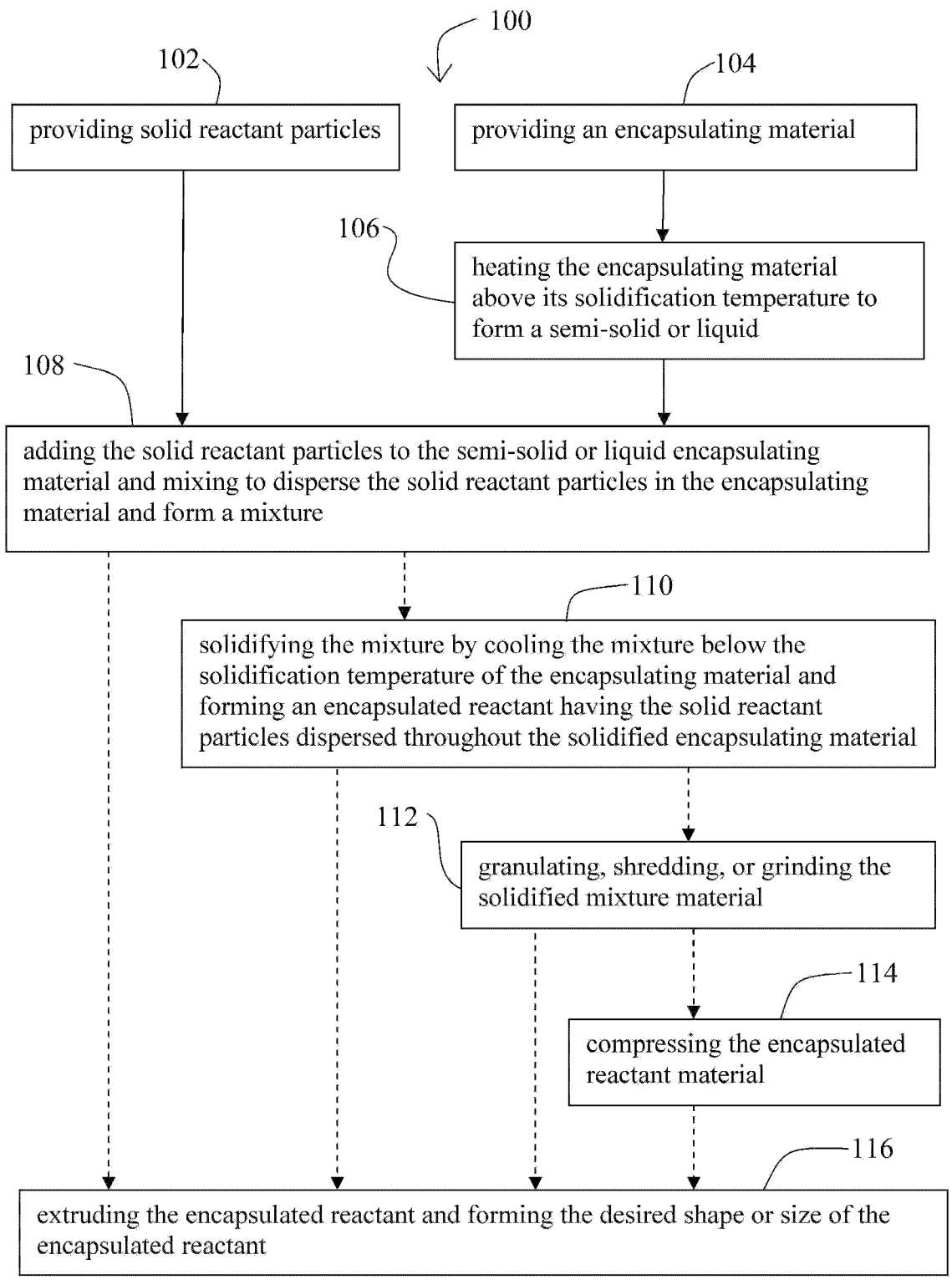

This application is a continuation of U.S. patent application Ser. No. 15/342,845, filed Nov. 3, 2016, which is incorporated by reference herein in its entirety.

FIELD OF THE DISCLOSURE

The invention relates to a shaped or sized encapsulated reactant and a method of making.

BACKGROUND

Discharges of hazardous materials into the environment have lead to contamination of surface water, soil, and aquifers resulting in potential public health problems and degradation of the land for future use. As used in this specification and appended claims, hazardous materials means chemicals or substances that are either toxic or highly toxic, an irritant, corrosive, a strong oxidizer, a strong sensitizer, combustible, either flammable or extremely flammable, dangerously reactive, pyrophoric, pressure-generating, a compressed gas, a carcinogen, a teratogen, a mutagen, a reproductive toxic agent, suspected of having adverse health effects on humans, or listed or regulated by a government agency as being a hazardous material. For example, the U.S. Environmental Protection Agency (USEPA) has established maximum concentration limits (MCLs) for various hazardous materials in water and soils. For instance, stringent drinking water limits placed on many solvent organic compounds in water can be as low as 0.005 mg/L (parts per billion).

In some cases, subsurface groundwater contaminant plumes having hazardous materials may extend hundreds to thousands of feet from the source of a release of the hazardous material into the environment. These hazardous materials may then be transported into drinking water sources, lakes, rivers, and even basements of homes. The presence of hazardous materials in subsurface soils, surface soils, surface water, and groundwater is a well-documented and extensive problem. The source of these hazardous materials is often times from industry where the hazardous materials are released onto the soil surface or surface water or even into the subsurface soil and/or groundwater through leaking storage tanks. Many, if not most, of these hazardous materials are capable of moving through the soil under the influence of moving water, gravity, or capillary action and serve as a source of groundwater contamination. As used in this specification and appended claims, soil is to be interpreted broadly to include all naturally occurring material found at or below ground surface (e.g. silts, clays, sands, rock, karsts, organics, tills, etc.).

Soil, surface water, groundwater, and wastewater can become contaminated with a variety of hazardous materials, organic and inorganic. For example, the environment may become contaminated with volatile, semi-volatile, and non-volatile organic compounds such as PCBs, gasoline, oils, wood preservative wastes, and other hazardous materials. Such other hazardous materials may include, but not limited to, chlorinated solvents (such as trichloroethylene (TCE), vinyl chloride, tetrachloroethylene (PCE), dichloroethanes), ethylene dibromide, halobenzenes, polychlorinated biphenyls, acetone, ter-butyl alcohol, tert-butyl formate, and anilines. Additional contaminants include compounds containing at least one oxidizable aliphatic or aromatic compound and/or functional group (e.g. atrazine, benzene, butyl mercaptan, chlorobenzene, chloroethylvinyl ether, chloromethyl methyl ether, chlorophenol, chrysene, cyanide ion or organic cyanides, dichlorophenol, dichlorohenzene, dichloroethane, dichloroethene, dichloropropane, dichloropropene, ethyl alcohol, ethylbenzene, ethylene glycol, ethyl mercaptan, hydrogen sulfide, isopropyl alcohol, Lindane™, methylene chloride, methyl tert-butyl ether, naphthalene, nitrobenzene, nitrophenol, pentachlorophenol, phenanthrene, phenol, propylene, propylene glycol, Silvex™, Simazine™, sodium sulfide, tetrachloroethane, tetrachloroethene, toluene, trichlorobenzene, trichloroethane, trichloroethene, trichlorophenol, vinyl chloride, xylene, etc). Inorganic hazardous materials may include metals and substances having a mineral origin.

Contaminated soil, surface water and groundwater may need to be removed or treated to make it less toxic or to meet regulatory requirements. There are a variety of reactants and methods for treating contaminated soil, surface water, groundwater, and wastewater. For example, peroxydisulfates may be used for carbon digestion or decomposition. Application methods include thermally activated persulfate oxidation in conjunction with an electro-osmosis system to heat and transport persulfate anions into soils. Permanganate(s) and peroxygen(s) reactant(s) may also be applied constituents for oxidation of materials. Peroxygen compound(s) applied independently or in conjunction with a metallic salt catalyst(s) (complexed and not complexed; chelated and not chelated) may break down materials within the soil, groundwater, and wastewater and make it less toxic, or non-toxic.

Treatment methods of groundwater and subsurface soil include injection of reactant(s), with or without a catalyst(s), and the installation of permeable reactive barriers (PRB). Installation of a PRB may include excavation of a trench at or beyond a subsurface plume of organic and/or inorganic contaminant(s). The trench may be filled with reactant(s) and optionally a permeable media(s) (i.e. sand) for the plume to flow through for a reaction with the hazardous materials.

Another treatment method of groundwater and subsurface soil may include boring one or more boreholes and placing reactant(s) into the boreholes. A plurality of selectively placed boreholes may provide for the installation of a PRB. For example, one or more boreholes may be placed just down flow of a plume of contamination. The boreholes may be charged with reactant(s) directly or a tube or pipe configured to permit flow of water through a circumferential surface thereof may be placed into the borehole(s). The tube or pipe may be porous or otherwise permeable, such as tubing or pipe having perforations, slots, or other openings therein configured to provide the flow of water through the wall of the tubes or pipes.

It may be desired to provide shaped or sized encapsulated reactant(s) for the treatment of materials.

SUMMARY

In one aspect of the present disclosure, a method of making an encapsulated reactant having a desired shape or size comprises providing solid reactant particles and an encapsulating material. The encapsulating material is heated above its solidification temperature to form a molten, semi-solid, or liquid encapsulating material. The solid reactant particles are added to the molten, semi-solid, or liquid encapsulating material and mixed to disperse the solid reactant particles in the encapsulating material and form a mixture. The mixture is extruded to form the desired shape or size of the encapsulated reactant.

In another aspect of the present disclosure, a method of making a shaped or sized encapsulated reactant comprises providing a solid mass of an encapsulated reactant having solid reactant particles dispersed throughout a solid encapsulating material. Granulating, shredding, or grinding the solid mass of encapsulated reactant and reducing the size of the solid mass of encapsulated reactant forms the shaped or sized encapsulated reactant.

In a further aspect of the present disclosure, a method of making an encapsulated reactant having a desired shape or size comprises providing solid reactant particles and a water insoluble encapsulating material. The solid reactant particles are dispersed in the water insoluble encapsulating material which forms a mass of encapsulated reactant having the solid reactant particles dispersed throughout the water insoluble encapsulating material. A desired shape or size of the encapsulated reactant is formed by extruding, granulating, shredding, grinding, or pressing the mass of encapsulated reactant into the desired shape or size.

BRIEF DESCRIPTIONS OF THE DRAWINGS

Figure 2B:
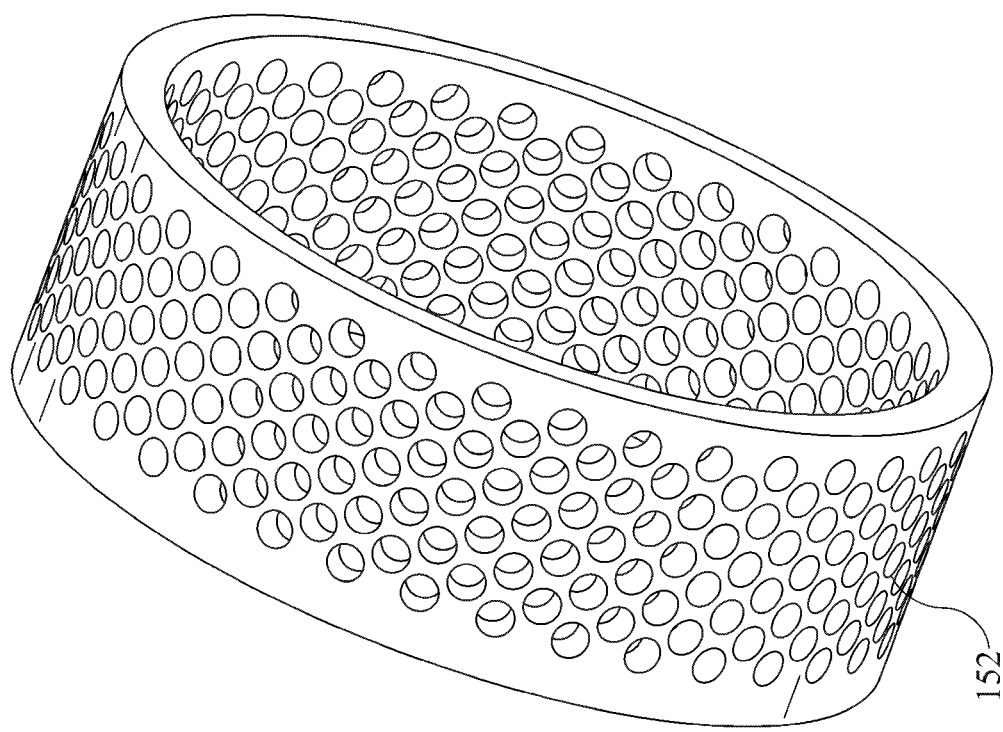
Figure 2A:
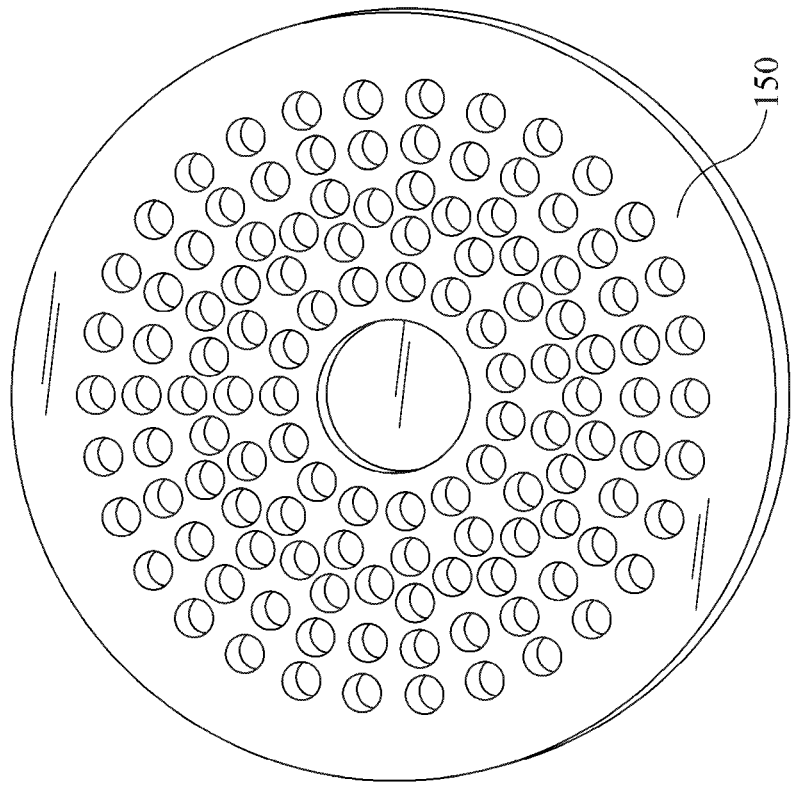

The foregoing and other features of this disclosure will become more fully apparent from the following description and appended claims, taken in conjunction with the accompanying drawings and examples. Understanding that these drawings depict only several embodiments in accordance with the disclosure and are, therefore, not to be considered limiting of its scope, the disclosure will be described with additional specificity and detail through use of the accompanying drawings, in which:

FIG. 1 schematically shows a process flow diagram of a method of making an encapsulated reactant having a desired shape or size;

FIG. 2A shows an illustrative example of an axial die that may be used for extrusion of encapsulated reactant; and FIG. 2B shows an illustrative example of a radial die that may be used for extrusion of encapsulated reactant.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure provides a shaped or sized encapsulated reactant and method of making. An encapsulated reactant having a desired shape or size may be provided for the use in the treatment of materials, for example hazardous materials. For example, surface water, soil, and aquifers may be treated with the encapsulated reactant having a desired shape or size made by the presently disclosed method. The encapsulated reactant having a desired shape or size of the present disclosure may provide a reactant having desired characteristics. These characteristics may include liquid flow through properties of a column or quantity of encapsulated reactants such as void space, tortuous path, and surface area. The void space, tortuous path, and surface area may provide a desired contact of the encapsulated reactant having a desired shape or size with the hazardous material(s) being treated. Other characteristics may include the holding or retaining of the shaped or sized reactants in a well, or permeable, perforated, slotted, or otherwise liquid flow through reactant holder or well casing. Further characteristics of the shaped or sized encapsulated reactant made by the presently disclosed method may include its ability to penetrate into surface or subsurface formations or soils, silts, clays, sands, rock, karsts, organics, tills, etc.

Presently disclosed are methods of making an encapsulated reactant having a desired shape or size. Examples of materials and characteristics of materials that may be used to make the encapsulated reactant, examples of desired shapes or sizes of encapsulated reactants, examples of equipment that may be used to make the encapsulated reactant, examples of processing steps that may be performed, and example applications of the encapsulated reactant are presently disclosed. The examples and embodiments are provided for disclosure and do not limit the provided claims.

FIG. 1 shows a process flow diagram of a method of making an encapsulated reactant having a desired shape or size, 100. Step 102 comprises providing solid reactant particles. The provided solid reactant particles may be selected to provide at least a portion of the media being treated to have at least one less hazardous characteristic or other desired characteristic. The solid reactant particles provided at step 102 may have one or more oxidants, reductants, catalysts, chelants, and transition metal amine complexes. The solid reactant particles may have a plurality of different reactants, catalysts, chelants, or transition metal amine complexes. For example, the solid reactant particles may have one or more reactants such as peroxides, permanganates, persulfates, hypochlorite, zero valent iron, halogens, sodium thiosulfate, and polysulfides. The provided solid reactant particles may have a variety of shapes or sizes. For example, the solid reactant particles may have dimensions ranging from centimeters to micrometers.

At step 104, an encapsulating material is provided. The encapsulating material may provide for the targeting characteristic of the encapsulated reactant having a desired shape or size by masking, protecting, stabilizing, delaying, and/or controlling a reaction between the solid reactant particles and a contaminant(s) or hazardous material(s). For example, the encapsulating material may be substantially oleophilic (i.e. has a stronger affinity for oils rather than water), hydrophobic, siliphilic, hydrocarbon soluble, or a combination thereof. The encapsulating material may save the solid reactant particles from reacting with water or untargeted constituents, or minimize undesired reactions, in the media being treated. For example, the encapsulating material may be designed to minimize reaction with naturally occurring elements in the groundwater or other benign constituents, saving or preserving at least a portion of the reactant to react with target materials, contaminants, or hazardous materials. The encapsulating material may be substantially reactive, permeable and/or dissolvable with at least one target compound(s) being remediated. The encapsulating material may have a combination of oils, waxes, or other constituents that may provide the shaped or sized encapsulated reactant with desired properties. In at least one embodiment of the present disclosure, the encapsulating material comprises one or more waxes, such as paraffin wax.

At step 106, the encapsulating material is heated to a temperature above its solidification temperature to form a molten, semi-solid, or liquid encapsulating material. A flowable encapsulating material may provide for the mixing of the solid reactant particles into the encapsulating material.

At step 108, the solid reactant particles are added to the molten, semi-solid, or liquid encapsulating material and mixed to disperse the solid reactant particles in the encapsulating material and form a mixture. The mixture may be moved, poured or pumped for example, to a container or onto a surface for cooling. Alternatively, the mixture may be moved while in molten state for further processing. For example, the mixture may be moved directly to an extruder for extruding at step 116.

At step 110, the mixture may be solidified by cooling the mixture below the solidification temperature of the encapsulating material and forming an encapsulated reactant having the solid reactant particles dispersed throughout the solidified encapsulating material. The cooling and solidifying of the mixture to form the solid encapsulated reactant may be optional as the mixture may be further processed without being solidified, the mixture may be extruded for example.

Upon solidification of the mixture, the encapsulated reactant having the solid reactant particles dispersed throughout the solidified encapsulating material may be granulated, shredded, or ground at step 112. Step 112 is optional as the solidified encapsulated reactant may be in a form for further processing, for example the encapsulated reactant formed as step 110 may be extruded at step 116. The granulated, shredded, or ground encapsulated reactant may then be compressed by an amount sufficient to increase its bulk density, at step 114. The granulating, shredding, grinding, or compressing of the solidified encapsulating material, at steps 112 and 114, may be optional as the solidified encapsulating material may have a desired shape or size for further processing or use in treating selected materials or hazardous materials.

At step 116, the encapsulated reactant is extruded to form the desired shape or size of the encapsulated reactant. Step 116 may comprise compressing the encapsulated reactant, step 114, and pressing the encapsulated reactant through orifices in a die. The extruded encapsulated reactant may be cut to desired lengths. For example, a knife, or reciprocating knife, may be placed adjacent the die for cutting. Steps 114 and 116 may be optional as granulating, shredding, or grinding of the solidified mixture may provide the desired shape or size of the encapsulated reactant.

Extruding, as used herein, means a process used to create objects of a fixed cross-sectional profile by pushing the encapsulated reactant through a die. Extruding may be continuous or semi-continuous and may be performed with hot or cold encapsulated reactant. For example, extruding the encapsulated reactant may be performed with hot extrusion, cold extrusion, warm extrusion, or microectrusion. Microextrusion may produce encapsulated reactants having a diameter or cross-sectional dimension in the submillimeter range.

For example, pellets having a desired shape or size may be formed by feeding encapsulated reactant, which may have been granulated, shredded, or ground before going to a feed screw. The encapsulated reactant may be heated and the screw, or screws, may compress the encapsulated reactant and force it through a die, forming the encapsulated reactant into the desired shape or size. In the case of hot extrusion, the extrudate, exiting the die, may be cooled and solidified. For example, the extrudate may be pulled through the die or water tank. The extrudate may then be cut to desired lengths, thus providing a desired shape or size of the encapsulated reactant.

There are many different variations of extrusion equipment that may be used for extruding the encapsulated reactant and forming the desired shape or size of the encapsulated reactant. For example, extrudate may be formed with movement of the extrusion with relation to the ram. The die may be held stationary and the ram may move towards the die for "direct extrusion". Direct extrusion may pressurize or compress the encapsulated reactant, or mixture having the encapsulating material and solid reactant particles, up to, and even over 35 MPa (5000 psi). Alternatively, the ram may be held stationary and the die may move towards the ram for "indirect extrusion". The position of the press may be either vertical or horizontal and the drive may be hydraulic or mechanical.

The extruder may have a die that may be axial or radial. FIG. 2A shows an illustrative example of an axial die 150 that is circular and has a plurality of axially aligned die orifices. FIG. 2B shows an illustrative example of a radial die 152 that is cylindrical and has a plurality of radially aligned die orifices. The design of the die or extrusion profile may vary to provide a desired shape encapsulated reactant. In at least embodiment, the die comprises a plurality of rounded or other geometrically shaped orifices, such as triangular, rectangular, square, or shapes having five or more sides. In at least one embodiment, the largest dimension, or diameter, of the orifices in the die may be between about 0.1 mm and 5 cm. In at least one other embodiment, the largest dimension, or diameter, of the orifices in the die may be less than 0.1 mm. In at least one additional embodiment, the largest dimension, or diameter, of the orifices in the die may be greater than 5 cm. The selected diameter of the orifices may be dependent upon the diameter of the well, subsurface formation, size of openings in a reactant holder or well casing, cut lengths of the extrusion, characteristics of materials being extruded, or other parameters. For example, the largest dimension, or diameter, of the orifices in the die may be between about 2 inches and about 5 inches. In at least one illustrative example, the largest dimension, or diameter, of the orifices in the die may be about 2.5 inches, which may be compatible with standard 3.25 inch direct push tooling or may be sized or shaped for installing in holders configured for placement in standard 4" well construction materials.

The encapsulated reactant may be formed, shaped, or sized with a pellet mill. For example, a VPM 650 Pellet Mill, VPM 520 Pellet Mill, or VPM 250 Pellet Mill, by Vecoplan®, Midwest, of Floyds Knobs, Ind., may form, shape, or size the encapsulated reactant. The pellet mill may use a feed screw to move material into a compression "chamber", wherein the encapsulated reactant is compressed. A system of rollers and presses may extrude the encapsulated reactant radially, or axially, through a die, for example die 150 or 152. Roller press systems may also be used to press/extrude the encapsulated reactant through a flat die. The encapsulated reactant may be formed or shaped with a screw extruder. For example, a meat grinder by Kitchenware Station, of El Monte, Calif. may also be used to press/extrude the encapsulated reactant through a die.

In at least one embodiment of the present disclosure, a method of making a shaped or sized encapsulated reactant comprises providing a solid mass of an encapsulated reactant having solid reactant particles dispersed throughout a solid encapsulating material. The solid mass of encapsulated reactant may be granulated, shredded, or ground, reducing the size of the solid mass of encapsulated reactant to form the shaped or sized encapsulated reactant.

In at least one embodiment of the present disclosure, granulating means taking larger components and making them smaller. Granulators may have the ability to reduce certain materials to a much smaller particle size than a grinder. Granulators may have an "open rotor" design, as opposed to a "closed rotor" design typically found with grinders. This means that there may be a great deal of air space around the rotor for product agitation and cooling. The open rotor may allow for better processing of lighter materials that may not be well suited for a closed rotor design. A granulator, with an open rotor type design may be more applicable in taking small components in the ½" to 6" or 8" sizes and reducing them to much smaller chips than a grinder. For example, the shaped or sized encapsulated reactant may be shaped or sized in the range of 5/16" flake to even powders. The encapsulated reactant may be granulated after a process step of size reduction. A granulator such as a 10 HP Wortex model, by Wortex Maquinas, of Campinas, Brazil may be used to form an encapsulated reactant having a desired shape or size. The granulator may have a screen or sieve.

As used herein, shredding is taking large components and shredding them down to smaller components. Shredding is normally carried out in a shredder that is low speed and high torque. Encapsulated reactant may be shredded to a size in the range of about an inch, or less, to about 2 inches, or more. A shredder may have counter rotating shafts turning at slightly different speeds. A dual shaft shredder may operate at low speed and high torque. Hook shear blades may extend from the shafts. The number of hooks, reach of hooks, and blade thickness may be selected to provide a desired size, or size range, of shaped or sized encapsulated reactant. Shredders may be configured for each unique shredding application by choosing different knife widths, knife hook designs, fingers, and screens to achieve the desired shred size and production rate as desired. For example, shredder MODEL NOs.MS-1714, MS-2817, MS-4220, MS-4526, MS-5028, MS-5040, and MS-6040, by Jordan Reduction Solutions, of Birmingham, Ala., may be used to selectively shape or size the encapsulated reactant.

Grinding, as used herein means the shaving, chipping or "grinding" of small pieces off of a larger piece. Grinders may have a closed rotor design, meaning the rotor is closed. Grinders may operate at high speed and have very tight tolerances. The closed rotors may leave little room for the product being process to go anywhere other than across the cutting edges. Grinding may comprise an application to take any larger raw material and process it in the grinder to obtain a small enough particle, chip or fiber suitable for the shaped or sized encapsulated reactant of the present disclosure, or suitable for further processing such as extruding. For example, size reduction may be performed by grinding off small pieces until the original part is in thousands of smaller consistent chips. The size of the chips of the encapsulated reactant may be less than ¼" to ½" or larger. Various grinders may be used in the presently disclosed method of making an encapsulated reactant having a desired shape or size. For example, the 13, 14 and 15 Series Grinders by Jordan Reduction Solutions, of Birmingham, Ala., may be used.

In at least one embodiment, combinations of shredding, grinding, or granulating may be performed to form a desired shape or size of encapsulated reactant. These steps may be performed in a combination system. For example, a combination shredder may be used which may have a low speed shredder and a high speed grinder. The shredder may perform an initial size reduction into strips or chips which may then be fed to a high speed product grinder to reduce it to a crumb, pellets, beads, chips, or even powdered particle sizes.

Ground, shredded, or granulated encapsulated reactant may be separated by shape or size. For example, ground, shredded or granulated encapsulated reactant may be separated by screening or sieving. Screening or sieving may be performed with a gyratory screen, vibrating screen, reciprocating screen, circular screen, or sieve. Screen sizes may vary from a fraction of an inch to over an inch. For example, a screen having a screen size between about 0.1 mm and 5 cm or between about ¼ inches to about ⅞ inches, may be used. In at least one embodiment of the present disclosure, a screen size or sieve may correspond to sizing or shaping of the encapsulated reactant to have an appropriate shape or size for direct particle emplacement via hydro-fracturing. For example, a screen size may be selected to provide hydro-fracturing proppant materials. Proppant sizes may generally be between about 8 and 140 mesh (106 µm-2.36 mm), for example 16-30 mesh (600 µm-1180 µm), 20-40 mesh (420 µm-840 µm), 30-50 mesh (300 µm-600 µm), 40-70 mesh (212 µm-420 µm), or 70-140 mesh (106 µm-212 µm).

In at least one other embodiment of the present disclosure, a screen size or sieve may correspond to sizing or shaping of the encapsulated reactant to have an appropriate shape or size for placement into a well, well casing, or reactant holder. In an illustrative example, the sizing or shaping of the reactant may be performed to provide the encapsulated reactant with a desired size or shape to be held within a well, or to provide desired penetration into the subsurface formation about the well. For example, a Geoprobe °, manufactured by Geoprobe Systems®, Salina, Kans., may be used to install a borehole or well, and the encapsulated reactant may be sized or shaped to be inserted directly into the borehole or well through the drill tooling or direct push rig tooling.

In at least one additional embodiment, the sizing or shaping of the reactant may be performed to provide the encapsulated reactant with a desired size or shape to be held in a well casing or reactant holders having holes, slots, perforations, or other openings for the flow through of water and materials to be treated. In at least one embodiment, a well casing or reactant holders may have characteristics making it permeable to water and hazardous materials being treated. For example, well casings or reactant holders may comprise one or more tubes or pipes which may be comprised of materials such as PVC, HDPE, polyethylene, ductile iron, copper, and steel. A well casing may comprise a sole tube or pipe and reactant holders may comprise a plurality of tubes or pipes. For example, reactant holders may be configured to be stacked in a well casing or be in the form of joined sections. The shaped or sized encapsulated reactant may have a shape or size for being held in the flow through portions, for example screened, slotted, or otherwise permeable portions, of the well casing or reactant holders. The providing of a solid mass of an encapsulated reactant having solid reactant particles dispersed throughout a solid encapsulating material may be performed by heating a solid encapsulating material above its solidification temperature to form a molten, semi-solid, or liquid encapsulating material. Solid reactant particles may then be added to the molten, semi-solid, or liquid encapsulating material and mixed to disperse the solid reactant particles in the molten, semi-solid, or liquid encapsulating material and form a mixture. The mixture may be solidified by cooling to a temperature below the solidification temperature of the encapsulating material and forming the solid mass of encapsulated reactant. The encapsulating material may be substantially oleophilic, hydrophobic, siliphilic, or hydrocarbon soluble and the solid reactant particles may have one or more oxidants, reductants, catalysts, chelants, and transition metal amine complexes, and combinations thereof.

An encapsulated reactant having a desired shape or size may be made by providing solid reactant particles and a water insoluble encapsulating material. The solid reactant particles may be dispersed in the water insoluble encapsulating material to form a mass of encapsulated reactant having the solid reactant particles dispersed throughout the water insoluble encapsulating material. The mass of encapsulated reactant may then be formed into a desired shape or by extruding, granulating, shredding, grinding, or pressing. The mass may be in a flowable form and fed into an extruder or presser or the mass may be solid and fed into an extruder, granulator, shredder, grinder, or presser.

Forming a desired shape or size of the encapsulated reactant may comprise a first step of granulating, shredding, or grinding the mass of encapsulated reactant followed by a second step of compressing the granulated, shredded, or ground encapsulated reactant in a briquetter, press, or an extruder.

As used herein, a briquetter is an apparatus that compresses a material into a desired shape or size. The adhesion or cohesion of the encapsulating material may be sufficient for substantially maintaining the shape of the briquette. A mixture of encapsulating material and reactant may be placed into a briquetter and compressed into a desired shape or size. In at least one embodiment of the present disclosure, a solid mass of encapsulated reactant may be granulated, shredded or ground and compressed in a briquetter by an amount sufficient to increase the bulk density of the granulated, shredded, or ground encapsulated reactant and form a briquette. The water insoluble encapsulating material may have an adhesion or cohesion sufficient for maintaining the desired shape or size of the encapsulated reactant upon the compressing of the granulated, shredded, or ground encapsulated reactant. For example, a briquette press by Biomass Briquette Systems, LLC of Chico, Calif. may be used to form briquettes of encapsulated reactant having a desired shape or size.

EXAMPLES

A solid mass of an encapsulated reactant having solid reactant particles dispersed throughout a solid encapsulating material was first prepared. The encapsulating material was heated above its solidification temperature to form a semi-solid or liquid encapsulating material. Reactant particles were added to the semi-solid or liquid encapsulating material and mixed, which dispersed the reactant particles in the semi-solid or liquid encapsulating material and formed a mixture. The mixture was cooled below the solidification temperature of the encapsulating material and the mixture solidified to form the solid mass of encapsulated reactant.

Example 1

The prepared solid mass of encapsulated reactant was extruded to form cylindrical pellets by shredding the prepared solid mass of encapsulated reactant in a shredder. An example shredder that may be used to shred the mass of encapsulated reactant is a 1100 rotary shredder made by Vecoplan, 4005 Earnings Way, New Albany, Ind. 47150. However, it is to be understood that other and different shredders may be used to shred the mass of encapsulated reactant. The shredded encapsulated reactant was then fed into a VPM 650 Pellet Mill, by Vecoplan, 4005 Earnings Way, New Albany, Ind. 47150. The shredded encapsulated reactant was compressed in the pellet mill which increased the bulk density of the shredded encapsulated reactant by substantially eliminating the void space or air in the shredded encapsulated reactant. The compressing of the encapsulated reactant pressed the encapsulated reactant through orifices in a die. Upon exiting the die, the extrusions were cut with a reciprocating knife to form cylindrical pellets. The diameter of the orifices in the die, pressure pressing the encapsulated reactant through orifices in the die, and speed of the reciprocating knife were set to produce pellets having a desired shape or size.

Example 2

The prepared solid mass of encapsulated reactant was ground and sized to produce a desired shape or size of the encapsulated reactant. The solid mass of encapsulated reactant was fed into a Wortex granulator with a circular screen.

Example 3

The solid mass of encapsulated reactant was formed into briquettes. The prepared solid mass of encapsulated reactant was shredded in a shredder and then fed into a BP-100 briquette press, by Biomass Briquette Systems, LLC, Chico, Calif. 95927 USA. The shredded encapsulated reactant was compressed up to about 15 MPa psi in the briquette press which increased the bulk density of the shredded encapsulated reactant by substantially eliminating the void space or air in the shredded encapsulated reactant. The adhesion or cohesion of the encapsulating material was sufficient for substantially maintaining the shape of the briquette.

The invention is illustrated by way of example in the drawing Figures and throughout the written description. It should be understood that other additional embodiments of the disclosed method of making an encapsulated reactant having a desired shape or size will become apparent to persons having ordinary skill in the art upon reading the present disclosure.

One feature or aspect of an embodiment is believed at the time of the filing of this patent application to possibly reside broadly in a method of making an encapsulated reactant having a desired shape or size comprising the steps of: providing solid reactant particles; providing an encapsulating material; heating the encapsulating material above its solidification temperature to form a molten, semi-solid, or liquid encapsulating material; adding the solid reactant particles to the molten, semi-solid, or liquid encapsulating material and mixing to disperse the solid reactant particles in the encapsulating material and form a mixture; and extruding the mixture and forming the desired shape or size of the encapsulated reactant.

Another feature or aspect of an embodiment is believed at the time of the filing of this patent application to possibly reside broadly in a method of making an encapsulated reactant having a desired shape or size comprising a step of solidifying the mixture, upon formation of the mixture, by cooling the mixture below the solidification temperature of the encapsulating material, the step of extruding the mixture comprises extruding the solidified mixture.

Yet another feature or aspect of an embodiment is believed at the time of the filing of this patent application to possibly reside broadly in a method of making an encapsulated reactant having a desired shape or size, wherein the encapsulating material is substantially oleophilic, hydrophobic, siliphilic, or hydrocarbon soluble.

Still another feature or aspect of an embodiment is believed at the time of the filing of this patent application to possibly reside broadly in a method of making an encapsulated reactant having a desired shape or size, wherein the encapsulating material comprises wax.

A further feature or aspect of an embodiment is believed at the time of the filing of this patent application to possibly reside broadly in a method of making an encapsulated reactant having a desired shape or size, wherein the solid reactant particles are selected from the group consisting of oxidants, reductants, catalysts, chelants, transition metal amine complexes, and combinations thereof.

Another feature or aspect of an embodiment is believed at the time of the filing of this patent application to possibly reside broadly in a method of making an encapsulated reactant having a desired shape or size, wherein the solid reactant particles have a reactant selected from the group consisting of peroxides, permanganates, persulfates, hypochlorite, zero valent iron, halogens, sodium thiosulfate, metabisulfite, polysulfides, and combinations thereof.

Yet another feature or aspect of an embodiment is believed at the time of the filing of this patent application to possibly reside broadly in a method of making an encapsulated reactant having a desired shape or size, wherein the step of extruding the encapsulated reactant comprises compressing the encapsulated reactant and pressing the encapsulated reactant through orifices in a die.

Still another feature or aspect of an embodiment is believed at the time of the filing of this patent application to possibly reside broadly in a method of making an encapsulated reactant having a desired shape or size comprising a step of granulating, shredding, or grinding the solidified mixture, the step of granulating, shredding, or grinding being performed prior to the step of compressing the encapsulated reactant.

A further feature or aspect of an embodiment is believed at the time of the filing of this patent application to possibly reside broadly in a method of making an encapsulated reactant having a desired shape or size, wherein the step of compressing the encapsulated reactant comprises compressing the granulated, shredded, or ground encapsulated reactant by an amount sufficient to increase the bulk density of the granulated, shredded, or ground encapsulated reactant.

Another feature or aspect of an embodiment is believed at the time of the filing of this patent application to possibly reside broadly in a method of making an encapsulated reactant having a desired shape or size comprising a step of cutting the extruded encapsulated reactant.

Yet another feature or aspect of an embodiment is believed at the time of the filing of this patent application to possibly reside broadly in a method of making a shaped or sized encapsulated reactant comprising the steps of: providing a solid mass of an encapsulated reactant having solid reactant particles dispersed throughout a solid encapsulating material; and granulating, shredding, or grinding the solid mass of encapsulated reactant and reducing the size of the solid mass of encapsulated reactant to form the shaped or sized encapsulated reactant.

One feature or aspect of an embodiment is believed at the time of the filing of this patent application to possibly reside broadly in a method of making a shaped or sized encapsulated reactant comprising a step of separating the shaped or sized encapsulated reactant.

Another feature or aspect of an embodiment is believed at the time of the filing of this patent application to possibly reside broadly in a method of making a shaped or sized encapsulated reactant, wherein the step of separating the shaped or sized encapsulated reactant comprises screening or sieving the granulated, shredded, or ground encapsulated reactant.

Yet another feature or aspect of an embodiment is believed at the time of the filing of this patent application to possibly reside broadly in a method of making a shaped or sized encapsulated reactant, wherein the step of providing a solid mass of an encapsulated reactant having solid reactant particles dispersed throughout a solid encapsulating material comprises: heating the solid encapsulating material above its solidification temperature to form a molten, semi-solid, or liquid encapsulating material; adding the solid reactant particles to the molten, semi-solid, or liquid encapsulating material and mixing to disperse the solid reactant particles in the molten, semi-solid, or liquid encapsulating material and form a mixture; and solidifying the mixture by cooling the mixture below the solidification temperature of the encapsulating material and forming the solid mass of encapsulated reactant.

Still another feature or aspect of an embodiment is believed at the time of the filing of this patent application to possibly reside broadly in a method of making a shaped or sized encapsulated reactant, wherein the encapsulating material is substantially oleophilic, hydrophobic, siliphilic, or hydrocarbon soluble.

A further feature or aspect of an embodiment is believed at the time of the filing of this patent application to possibly reside broadly in in a method of making a shaped or sized encapsulated reactant, wherein the solid reactant particles are selected from the group consisting of oxidants, reductants, catalysts, chelants, transition metal amine complexes, and combinations thereof.

Another feature or aspect of an embodiment is believed at the time of the filing of this patent application to possibly reside broadly in a method of making an encapsulated reactant having a desired shape or size comprising the steps of: providing solid reactant particles; providing a water insoluble encapsulating material; dispersing the solid reactant particles in the water insoluble encapsulating material and forming a mass of encapsulated reactant having the solid reactant particles dispersed throughout the water insoluble encapsulating material; and forming a desired shape or size of the encapsulated reactant by extruding, granulating, shredding, grinding, or pressing the mass of encapsulated reactant into the desired shape or size.

Yet another feature or aspect of an embodiment is believed at the time of the filing of this patent application to possibly reside broadly in a method of making an encapsulated reactant having a desired shape or size, wherein the step of forming a desired shape or size of the encapsulated reactant comprises a first step of granulating, shredding, or grinding the mass of encapsulated reactant followed by a second step of compressing the granulated, shredded, or ground encapsulated reactant in a briquetter, press, or an extruder.

Still another feature or aspect of an embodiment is believed at the time of the filing of this patent application to possibly reside broadly in a method of making an encapsulated reactant having a desired shape or size, wherein the second step of compressing the granulated, shredded, or ground encapsulated reactant comprises compressing the granulated, shredded, or ground encapsulated reactant by an amount sufficient to increase the bulk density of the granulated, shredded, or ground encapsulated reactant.

A further feature or aspect of an embodiment is believed at the time of the filing of this patent application to possibly reside broadly a method of making an encapsulated reactant having a desired shape or size, wherein the second step comprises compressing the granulated, shredded, or ground encapsulated reactant in a briquetter or press and the water insoluble encapsulating material has an adhesion or cohesion sufficient for maintaining the desired shape or size of the encapsulated reactant upon the compressing of the granulated, shredded, or ground encapsulated reactant.

Another feature or aspect of an embodiment is believed at the time of the filing of this patent application to possibly reside broadly in a method of making an encapsulated reactant having a desired shape or size, wherein the encapsulating material is substantially oleophilic, hydrophobic, siliphilic, or hydrocarbon soluble.

The present disclosure is not to be limited in terms of the particular examples or embodiments described in this application, which are intended as illustrations of various aspects. Many modifications and variations can be made without departing from its spirit and scope, as will be apparent to those skilled in the art. Functionally equivalent materials, equipment, methods, and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular size or shape, methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of making an encapsulated reactant having a desired shape or size comprising the steps of:
   providing solid reactant particles;
   providing an encapsulating material;

heating the encapsulating material above its solidification temperature to form a molten, semi-solid, or liquid encapsulating material;

adding the solid reactant particles to the molten, semi-solid, or liquid encapsulating material and mixing to disperse the solid reactant particles in the encapsulating material and form a mixture;

solidifying the mixture, upon formation of the mixture, by cooling the mixture below the solidification temperature of the encapsulating material; and extruding the mixture and forming the desired shape or size of the encapsulated reactant.

2. The method of claim 1, wherein the encapsulating material is substantially oleophilic, hydrophobic, siliphilic, or hydrocarbon soluble.

3. The method of claim 1, wherein the encapsulating material comprises wax.

4. The method of claim 1, wherein the solid reactant particles are selected from the group consisting of oxidants, reductants, catalysts, chelants, transition metal amine complexes, and combinations thereof.

5. The method of claim 1, wherein the solid reactant particles have a reactant selected from the group consisting of peroxides, permanganates, persulfates, hypochlorite, zero valent iron, halogens, metabisulfite, polysulfides, and combinations thereof.

6. The method of claim 1, wherein the step of extruding the encapsulated reactant comprises compressing the encapsulated reactant and pressing the encapsulated reactant through orifices in a die.

7. The method of claim 1 further comprising a step of granulating, shredding, or grinding the solidified mixture, the step of granulating, shredding, or grinding being performed prior to the step of extruding the solidified mixture.

8. The method of claim 6, wherein the step of compressing the encapsulated reactant comprises compressing the granulated, shredded, or ground encapsulated reactant by an amount sufficient to increase the bulk density of the granulated, shredded, or ground encapsulated reactant.

9. The method of claim 1 further comprising a step of cutting the extruded encapsulated reactant.

10. A method of making a shaped or sized encapsulated reactant comprising the steps of:

providing a solid mass of an encapsulated reactant having solid reactant particles dispersed throughout a solid encapsulating material;

wherein the solid reactant particles have a reactant selected from the group consisting of peroxides, permanganates, persulfates, hypochlorite, zero valent iron, halogens, metabisulfite, polysulfides, and combinations thereof; and granulating, shredding, or grinding the solid mass of encapsulated reactant and reducing the size of the solid mass of encapsulated reactant to form the shaped or sized encapsulated reactant.

11. The method of making a shaped or sized encapsulated reactant of claim 10 further comprising a step of separating the shaped or sized encapsulated reactant.

12. The method of making a shaped or sized encapsulated reactant of claim 11, wherein the step of separating the shaped or sized encapsulated reactant comprises screening or sieving the granulated, shredded, or ground encapsulated reactant.

13. The method of making a shaped or sized encapsulated reactant of claim 10, wherein the step of providing a solid mass of an encapsulated reactant having solid reactant particles dispersed throughout a solid encapsulating material comprises:

heating the solid encapsulating material above its solidification temperature to form a molten, semi-solid, or liquid encapsulating material;

adding the solid reactant particles to the molten, semi-solid, or liquid encapsulating material and mixing to disperse the solid reactant particles in the molten, semi-solid, or liquid encapsulating material and form a mixture; and solidifying the mixture by cooling the mixture below the solidification temperature of the encapsulating material and forming the solid mass of encapsulated reactant.

14. The method of making a shaped or sized encapsulated reactant of claim 10, wherein the encapsulating material is substantially oleophilic, hydrophobic, siliphilic, or hydrocarbon soluble.

* * * * *